United States Patent [19]

Warner

[11] 4,370,546
[45] Jan. 25, 1983

[54] KILN TEMPERATURE CONTROLLER

[76] Inventor: Gene L. Warner, P.O. Box 604, Grand Haven, Mich. 49417

[21] Appl. No.: 234,873

[22] Filed: Feb. 17, 1981

[51] Int. Cl.³ .............................................. H05B 1/02
[52] U.S. Cl. ................................... 219/497; 219/490; 219/501; 219/494; 373/104; 236/46 R; 374/181
[58] Field of Search ............... 219/490, 492, 493, 497, 219/501, 508, 494; 13/24; 236/46, 15 B; 73/361, 360, 359 R; 373/104

[56] References Cited

U.S. PATENT DOCUMENTS

| | | | |
|---|---|---|---|
| 2,724,040 | 11/1955 | Mouzon | 219/497 |
| 3,588,419 | 6/1971 | Rongier | 219/493 |
| 3,901,437 | 8/1975 | Harkins | 219/492 |
| 3,921,453 | 11/1975 | Platzer, Jr. | 307/117 |

OTHER PUBLICATIONS

"Linear Data Book" National Semiconductor, pp. 9-101 to 9-107, 1978.

*Primary Examiner*—M. H. Paschall
*Attorney, Agent, or Firm*—Price, Heneveld, Huizenga & Cooper

[57] ABSTRACT

A kiln temperature controller is provided comprising a circuit for providing a first signal representative of a selectable kiln temperature and a temperature detection circuit for providing a second signal representative of the detected kiln temperature. The temperature detection circuit comprises first and second thermocouples disposed in the kiln and in the temperature controller, respectively. The first and second thermocouples are coupled in series and in opposite polarity. A solid state temperature sensing circuit is provided in the kiln temperature controller, the temperature sensing circuit being coupled in series with the first and second thermocouples and providing an output signal having a polarity opposite that of the second thermocouple to nullify ambient temperature variations of the kiln temperature controller. The second thermocouple is provided with an isothermal relationship with respect to the solid state temperature sensing circuit and a solid state temperature compensated voltage source is provided for the temperature sensing circuit, the compensated voltage source being provided with an isothermal relationship with the temperature sensing circuit and the compensated voltage source being provided with $V_{be}$ characteristics identical to the $V_{be}$ characteristics of the solid state temperature sensing circuit. A comparator coupled to outputs of the temperature detection circuit and the signal representative of a selected kiln temperature is employed to actuate the kiln and apply heat to the kiln when the detected kiln temperature is below the desired kiln temperature.

5 Claims, 3 Drawing Figures

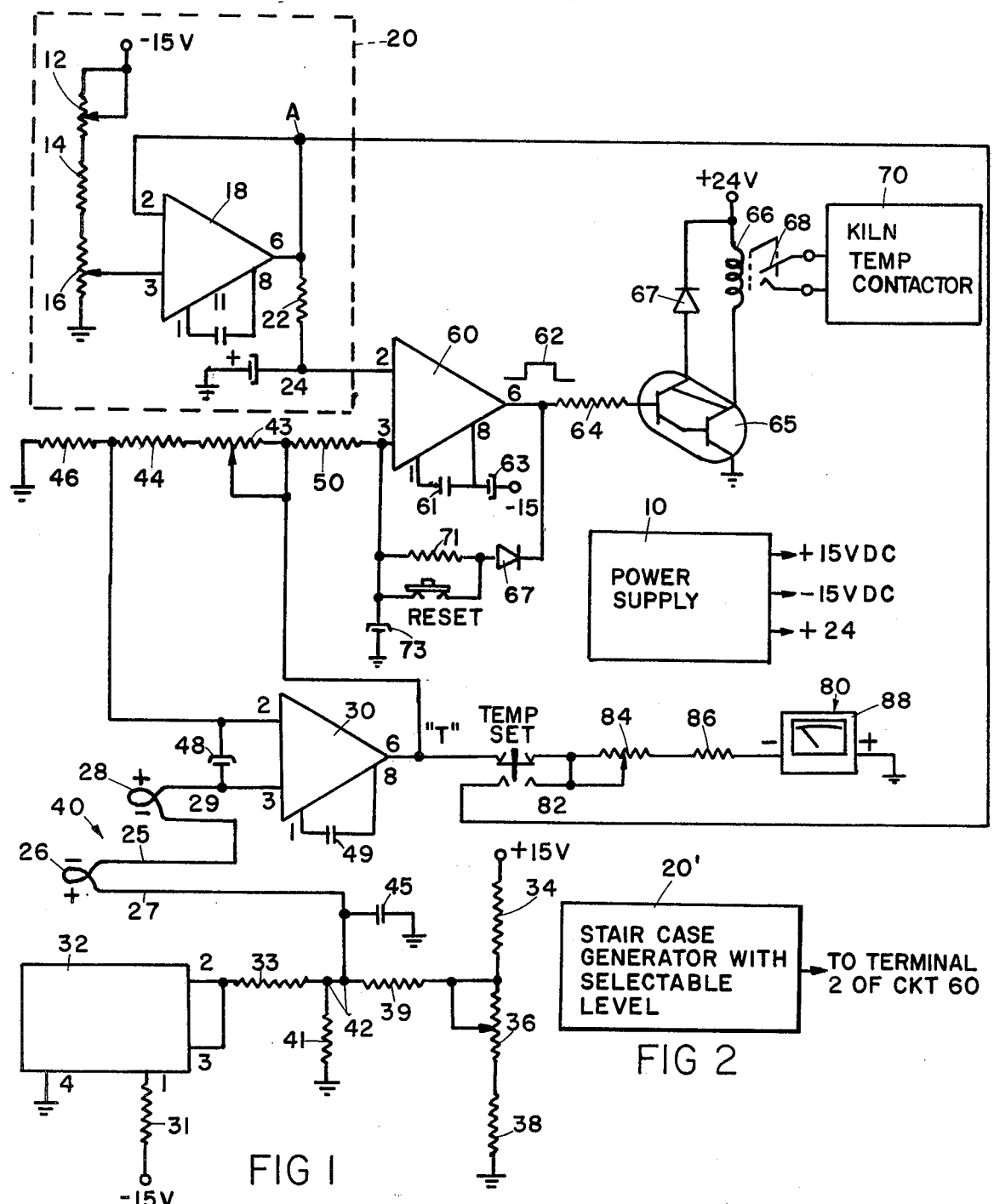

KILN TEMPERATURE CONTROLLER

This application is a continuation-in-part of U.S. patent application Ser. No. 25,897, filed Apr. 2, 1979 entitled KILN TEMPERATURE CONTROLLER.

BACKGROUND OF THE INVENTION

The present invention relates to temperature controllers and particularly to a temperature controller for a hobbyist kiln.

Kiln temperature controllers for small kilns used by hobbyists have in the past been relatively unsophisticated and as a result, the kiln temperature frequently does not reach or alternatively exceeds the desired temperature. This adversely affects the outcome of the ceramic articles being fired both as to the color of the articles as well as the physical properties of the ceramic material itself. Kiln temperature controllers for the hobbyist have involved, for example, mechanical controllers which use a meltable material positioned between spring loaded contacts to actuate the kiln heater at predetermined temperatures. Frequently these controllers do not operate at all or do not operate at the desired temperature to control the kiln temperature.

In other temperature controllers where thermocouples are employed to measure the temperature as well as turn off the kiln at a predetermined desired temperature; problems have been encountered with the ambient temperature variations which the temperature controller is subjected to. This results since the measuring thermocouple made of dissimilar metal wires when coupled to a circuit board or connector forms a second thermocouple junction in the controller which is remote from the temperature measuring thermocouple in the kiln and is subjected to varying ambient temperatures near the kiln. As the ambient temperature changes typically with the kiln temperature, the measurement thermocouple output becomes relatively inaccurate due to the added signal from the second junction. Temperature responsive resistors have been employed in an effort to compensate for this but without any significant success. Since the ambient temperature variations are unpredictable, due in part to the positioning of the kiln temperature controller at an individual installation and other variable factors including the location of the kiln with respect to the surrounding environment; no known adequate solution has yet been provided for correcting this problem.

Also it has long been recognized that the optimum temperature rise in the kiln for firing a ceramic article is approximately 270° F. per hour. Efforts to provide a kiln temperature controller to effect such temperature rise has involved the use of manually operated heater switches or bi-metallic infinite temperature controlling switches. Such systems either require nearly continuous operator attention or otherwise do not adequately control the temperature use time of the kiln.

SUMMARY OF THE INVENTION

The present invention solves these and other problems with the prior art by provision of a kiln temperature controller comprising a first thermocouple for insertion in the kiln, the first thermocouple serving to detect the temperature within the kiln; a second thermocouple coupled in series with the first thermocouple and arranged in opposite polarity thereto to isolate the first thermocouple from a copper connection; a solid state temperature sensing circuit coupled in series with the first and second thermocouples for providing an output signal having a polarity opposite that of the second thermocouple to nullify ambient temperature effect on the second thermocouple such that the controller provides an output signal accurately representing the detected kiln temperature; and a solid state temperature compensated voltage source for the temperature sensing circuit. The second thermocouple is soldered directly to the heat sink of the solid state temperature sensing circuit so that the second thermocouple and the temperature sensing circuit are provided with an isothermal relationship. The solid state temperature compensated voltage source for the temperature sensing circuit is preferably formed with the temperature sensing circuit in an integrated circuit common to both. Thus the solid state temperature compensated voltage source is provided with an isothermal relationship to the solid state temperature sensing circuit and both the voltage source and the temperature sensing circuit are provided with identical $V_{be}$ characteristics. This combination of features in a reference junction compensated temperature controller provides precision compensation over an extended temperature range ($\pm 0.025°$ C./°C., over $\pm 25°$ span) using commonly available components which currently cost approximately $1.08. This is a significant development since ambient temperature varies widely in kiln applications and in most more sophisticated kiln controllers of good quality presently available, $\pm 10°$ F. tracking is considered acceptable for the reference junction compensation. The low cost of the controller constructed according to the present invention allows large scale commercial exploitation of such controllers, making them available for the first time to the consumer or hobbyist.

In another embodiment of the present invention, an adjustable kiln temperature setting circuit is provided together with temperature monitoring means providing a visual display of the setting of the desired kiln temperature as well as the monitoring of the kiln temperature as it increases to the preset level. In still another embodiment of the present invention, the kiln temperature setting circuit provides a digital staircase corresponding to a desired kiln temperature rise time of approximately 270° F. per hour to optimize the firing of articles in the kiln.

These and other features, advantages and objects of the present invention will become apparent upon reading the following description thereof together with reference to the drawings in which:

BRIEF DESCRIPTION OF THE DRAWINGS

FIG. 1 is an electrical circuit diagram partially in block and schematic form showing a temperature controller embodying the present invention;

FIG. 2 is an electrical circuit diagram in block form of an alternative embodiment of the invention shown in FIG. 1; and FIG. 3 is an electrical circuit diagram of the solid state temperature sensing circuit illustrated in block form at 32 in FIG. 1.

DETAILED DESCRIPTION OF THE PREFERRED EMBODIMENT

Referring initially to FIG. 1 there is shown the kiln control circuitry embodying the present invention which includes a power supply 10 of conventional design for providing a regulated plus and minus 15 volts DC for providing operating power to the circuit components shown in FIG. 1 as well as a +24 volts DC for the temperature control relay 66 as described below. The circuitry shown in FIG. 1 includes a temperature setting circuit 20, a temperature measuring and compensating circuit 40, a comparator and control circuit 60 coupled to the temperature setting circuit 20 and to the temperature detecting circuit 40 for providing a control output signal to be employed for actuating a kiln temperature contactor circuit 70. Also included in the circuit of FIG. 1 is a temperature monitoring circuit 80. The function of circuit 20 is to provide a reference signal to comparator 60 representative of the desired temperature of kiln operation selectable from a range of from about 0° to 2500° F. Circuit 40 includes temperature sensing means and temperature compensating circuit for providing an accurate signal representative of the actual kiln temperature which signal is compared by comparator 60 with the desired temperature signal to provide a control signal to the kiln temperature contactor. The monitor circuit provides the operator with means for accurately selecting the desired temperature and monitoring the kiln temperature rise. Having briefly described the basic circuit components of the system, a detailed description of the individual circuits is now presented.

Referring initially to circuit 20, a series voltage dividing network comprising rheostat 12, resistor 14 and potentiometer 16 are coupled in series between the 15 volt supply and ground. The wiper arm of potentiometer 16 is coupled to input terminal 3 of a commercially available operational amplifier model No. LM301AN and is selectively moved to set the desired temperature of kiln operation. A feedback capacitor 11 is coupled between pins 1 and 8 of the operational amplifier 18 while output pin 6 is interconnected to input pin 2 and to an output terminal A coupled to the temperature monitor circuit 80. The output signal from terminal 6 of the amplifier 18 is a negative DC level selected by the adjustment of potentiometer 16 and is applied to input terminal 2 of comparator circuit 60 through a resistor 22. A capacitor 24 is coupled from pin 2 to ground as shown.

When the operator selects the desired kiln temperature, a push button switch 82 is moved from the position shown downwardly to couple terminal A to the wiper arm of a rheostat 84 serially coupled from switch 82 to an ammeter 88 through series coupled resistor 86. Resistor 84 is adjusted to calibrate meter 88 in °F. from 0° to 2500° F.

The temperature sensing and compensating circuit 40 includes a first or measuring thermocouple 26 which is a junction of dissimilar metals such as chromel-alumel having the polarity shown in the diagram. Leads 25 and 27 are of significant length to permit the first thermocouple 26 to be physically inserted within the kiln for detecting the actual kiln temperature. Lead 25 of thermocouple 26 is coupled to the negative terminal of a second or reference thermocouple 28 having its positive terminal 29 coupled to terminal 3 of an operational amplifier 30. The second thermocouple 28 is of the same type as the first thermocouple 26 and can be an I.S.A. type K device. Operational amplifier 30 is also a commercially available integrated circuit chip such as model LM301AN.

The second thermocouple 28 is positioned proximate to and in thermal conductivity with a solid state temperature sensing circuit 32 which is a commercially available integrated circuit model no. LM3911N by for example soldering the thermocouple to the heat sink of circuit 32 or otherwise positioning it so the temperature sensed by thermocouple 28 and that by circuit 32 of the circuit board on which the circuit elements shown in FIG. 1 are mounted will be approximately the same. Pin 4 of circuit 32 is coupled to ground while pin 1 is coupled to the 15 volt supply through a resistor 31. Output pins 2 and 3 of circuit 32 are interconnected and are coupled to the positive terminal 27 of thermocouple 26 by means of a series resistor 33. Terminal 27 is also coupled to a zero adjusting positive voltage source comprising a series combination of a resistor 34, a rheostat 36 and a resistor 38 coupled from the +15 volt supply to ground. The wiper arm of rheostat 36 is coupled to the junction of resistor 33 with conductor 27 (terminal 42) by means of a series resistor 39. The junction of resistors 33 and 39 is also coupled to ground through a resistor 40 and a capacitor 45.

Circuit 32 provides a negative DC voltage of about 3 volts which is increasingly negative at about 10 mV/°C. with increasing temperature. Resistors 33 and 40 divide this voltage such that it will track the positive voltage of approximately 12.5 $\mu V°/C$. slope of thermocouple 28 measuring the same ambient temperature such that the voltages produced by circuit 32 and thermocouple 28 will be offset. Rheostat 36 is adjusted to offset the −3 VDC output level of circuit 32. Thus the voltage provided by the measuring thermocouple 26 is the effective voltage provided by the temperature sensing means and is applied to input 3 of operational amplifier 30.

The integrated circuit, model no. LM3911N, which comprises the circuit 32 is commercially available from the National Semiconductor Corporation. The alphanumeric designation LM3911 identifies the integrated circuit employed in the preferred embodiment of this invention as a member of the product family which includes National's types LM135, LM235, LM335, LX5700, and LM3911. The LX prefix identifies the original mill-spec versions of the circuit while the LM prefix identifies an industrial grade spinoff from the original mill-spec circuit. The LM135, LM235, and LM335 group were later introduced to replace the two original types of circuits. Pages 9-101 through 9-107 of National Semiconductor's 1978 *Linear Data Book* describes the LM3911 circuit and possible applications therefor. The LM3911 circuit is a highly accurate temperature measurement and/or control system for use in −25° C. to +85° C. temperature range. The circuit is fabricated on a single monolithic chip and with reference now to FIG. 3, it is illustrated that the circuit 32 includes a solid state temperature sensor 32a, a stable voltage reference 32b, and an operational amplifier 32c. The temperature sensor 32a uses the difference in the emitter base voltages of a pair of transistors operating at different current densities as the basic temperature sensitive element. Since this output depends only on transistor matching, the same reliability and stability now obtained in conventional operational amplifiers is expected and achieved. The voltage reference 32a is a zener diode which comprises a solid state temperature compensated voltage source for the solid state temperature sensing circuit 32a. The zener diode comprises an active shunt regulator which is connected across the power leads of the temperature sensing circuit 32a to provide a stable 6.8 voltage reference for the sensing circuit. This allows the use of virtually any power supply voltage with suitable external resistors. Since the voltage source 32b and the sensor 32a are fabricated on a single monolithic chip, the voltage source and sensor are provided with an isothermal relationship and identical $V_{be}$ characteristics. Since the second thermocouple 28 is soldered directly to the heat sink of circuit 32, the second thermocouple 28 is also provided with an isothermal relationship with respect to the temperature sensing circuit 32a and the voltage source 32b.

As can be appreciated without the temperature compensation circuit, the junction of negative terminal 25 of the measurement thermocouple 26 to a copper contact on the circuit board to which the circuit elements are mounted forms a second thermocouple junction which, coupled in series with thermocouple 26, would otherwise cause an error voltage which is unpredictable due to the unpredictable ambient temperature changes to which the controller is subjected to. Operational amplifier 30 amplifies the temperature representative signal from thermocouple 26 and includes a feedback path from output pin 6 to input terminal 2 including rheostat 43 and series coupled resistor 44. Pin 2 is also coupled to ground through resistor 46. A capacitor 48 is coupled between input terminals 2 and 3 of the operational amplifier which provides a noninverting negative output signal at output terminal 6 thereof. Resistor 43 is adjusted to provide a 5 volt DC output signal level corresponding to 2500° F. A capacitor 49 is coupled between input terminals 1 and 8 of the operational amplifier. The temperature signal at output terminal 6 is coupled to input terminal 3 of the comparator circuit 60 by means of a resistor 50.

Comparator 60 is a commercially available integrated circuit chip such as model no. LM301AN, which compares the input signal from the reference temperature setting circuit 20 on pin 2 with the output signal from operational amplifier 30 applied to input terminal 3. When the detected temperature signal indicates the temperature is below the desired temperature, the output signal at pin 6 of circuit 60 is at a logic high level as indicated by the waveform diagram 62 adjacent terminal 6 thereby providing a positive signal through series resistor 64 to a Darlington amplifier 65. This causes amplifier 65 to conduct providing a current path from the +24 volt supply through relay coil 66 actuating relay contacts 68 which are coupled to the kiln temperature contactor 70. This in turn actuates the contactor to apply 220 v AC to the electrical kiln heater. A diode 67 bypasses relay coil 66 in a conventional circuit arrangement. Comparator 60 includes a capacitor 61 coupled between terminals 1 and 8 and a capacitor 63 coupled to the 15 volt supply to assure the output of comparator 60 will be low when power is first applied to the system thus initially maintaining the kiln off. The comparator 60 also includes a feedback path including diode 67 having its cathode coupled to terminal 6 of the comparator and its anode coupled into one terminal of a resistor 71 having its remaining terminal coupled to input terminal 3 of the comparator. A normally closed momentarily actuated pushbutton switch 72 is employed for resetting the comparator circuit as described in greater detail below. Pin 3 of the comparator is also coupled to ground through capacitor 73. Each of the integrated circuit chips 18, 30 and 60 are coupled to the plus and minus 15 volt supply through terminals 7 and 4 respectively (not shown) for receiving operating power therefrom.

In place of the DC level temperature setting circuit 20, shown in FIG. 1, a staircase generator 20' (FIG. 2) can be employed. The staircase generator can be of generally conventional design by employing for example in a commercially available integrated circuit model CD4040BCN for counting 60 Hz line frequency and applying the output signals therefrom to a series of three model CD4029BCN integrated circuit chips which are up down presettable counters. The output of the counters are matrixed through a resistive network to provide D/A conversion for providing a staircase ramp which corresponds to a rise rate of 270° F. per hour for the kiln temperature. By presetting the input terminals of the up down counters, through a conventional manual slewing circuit; the initial starting point of the 270° F. rise time can be controlled as can the terminating position.

OPERATION

In the embodiment shown in FIG. 1, after power has been applied to the circuit, the desired temperature is selected through potentiometer 16 while holding the temperature set switch 82 in a downward position until the needle on meter 80 reads the degree setting desired for kiln operation. It is assumed that the zero setting resistor 36 has previously been factory set for a correct temperature reading at ambient temperature conditions and resistor 42 has been factory calibrated for providing a 2500° reading at a measured temperature of 2500°. As the kiln temperature rises, the output signal at pin 6 of circuit 30 is applied to input terminal 3 of the comparator 60 and compared with the preset DC level at input terminal 2 of this circuit. So long as the kiln temperature is below the desired temperature setting, the output signal from comparator 60 will remain at a logic high triggering the Darlington amplifier 65 into conduction actuating relay 66 and the kiln temperature contactor to apply operating power to the kiln heater. Once the desired temperature has been reached comparator 60 changes state going to a logic 0 output level turning off the Darlington amplifier 65 and in turn deactivating relay 66 and its contact 68 to disconnect the kiln heater. At the same time, diode 67 becomes forward biased maintaining the output of comparator 60 at a logic low state thereby maintaining the kiln heater in an off condition.

If it is desired to restart the kiln while the operating power for the circuit is still on, reset button 72 is momentarily opened thereby coupling resistor 71 in series with diode 67 to unlatch the comparator allowing it to provide a positive output signal in the event the actual kiln temperature is once again below the preset kiln temperature. The latching diode 67, however, normally prevents the kiln from continued operation once the desired kiln temperature has been reached.

Naturally, in the embodiment shown in FIG. 2 where the staircase reference temperature signal is employed, latching diode 67 is omitted such that the kiln temperature contactor is pulsed on and off to gradually raise the kiln temperature at a slope of approximately 270° F. per hour.

Thus, with the system of the present invention a kiln temperature controller is provided which compensates for ambient temperature variations due to positioning of a controller near a kiln or in an environment in which the ambient temperature changes. Further, a relatively inexpensive kiln temperature controller for comparing a presettable temperature with the actual kiln temperature is provided to accurately control the kiln temperature of a hobbyist kiln. In the embodiment shown in FIG. 2 the rise time of kiln temperature is controlled to a predetermined desired slope for optimum firing of ceramic articles therein. Naturally the control circuit can be employed with gas fired kilns as well as an electric kiln. In either event a kiln contactor 70 or control of conventional design and integral with the kiln can be actuated by the circuit of the present invention.

In alternative embodiments of the invention a kiln temperature controller having a variable rise time may be provided. In these embodiments of the invention the controller is provided with a built-in frequency source which is adjustable, and which replaces the 60 Hz line frequency as the source for the ramp generator. Thus, the ramp is adjustable over a range of 0°–540° F./HR, rather than fixed at 270° F./HR. This model also incorporates a sixth switch (internal) which disables the shut-off function, permitting the ramp function to be used in both the up and down modes.

The variable rate feature responds to user demand. While 270° F./HR is a good average, it is possible to expedite the firing through some zones, while a slower rate might be more appropriate for thick pieces or special effects. The added downscale control capability was addressed primarily to the stained glass industry. For annealing purposes glass is taken rapidly up to 1000° F., then cooked at 50° F./hour down to room temperature. However, ceramics users have also started to use this feature.

It will become apparent to those skilled in the art that various modifications to the preferred embodiment of the invention disclosed and described herein can be made without departing from the spirit or scope of the invention as defined by the appended claims.

The embodiments of the invention in which an exclusive property or privilege is claimed are defined as follows:

1. A kiln temperature controller comprising:
    circuit means for providing first signals representative of a selectable desired kiln temperature;
    temperature detection means for providing second signals representative of the detected kiln temperature, said temperature detection means comprising:
    a first thermocouple for insertion in a kiln for detecting the temperature within a kiln;
    a second thermocouple coupled in series with said first thermocouple in opposite polarity thereto, with said second thermocouple positioned in the kiln temperature controller;
    means for defining a heat sink disposed in the kiln temperature controller;
    a solid state temperature sensing circuit in the kiln temperature controller, said temperature sensing circuit having a thermal connection to said means for defining a heat sink and said solid state temperature sensing circuit being coupled in series with said first and second thermocouples for providing an output signal having a polarity opposite that of said second thermocouple to nullify ambient temperature variations of the kiln temperature controller such that said temperature detection means provides an output signal accurately representing the detected kiln temperature;
    said second thermocouple having a thermal connection to said means for defining a heat sink for providing said second thermocouple with an isothermal relationship with respect to said solid state temperature sensing circuit;
    a solid state temperature compensated voltage source for said temperature sensing circuit;
    said solid state temperature compensated voltage source being provided with an isothermal relationship with said solid state temperature sensing circuit and said solid state temperature compensated voltage source being provided with $V_{be}$ characteristics identical to the $V_{be}$ characteristics of said solid state temperature sensing circuit; and
    comparator circuit means coupled to said circuit means and to said temperature detection means for providing control output signals employed for actuating a kiln to apply heat to the kiln when the detected kiln temperature is below the desired kiln temperature.

2. The system as defined in claim 1 and further including temperature display means coupled to said temperature detection means for displaying the kiln temperature.

3. The system as defined in claim 2 and further including means for selectively coupling said temperature display means to said circuit means for monitoring the desired kiln temperature as it is selected by the operator.

4. The system as defined in claim 3 wherein said circuit means comprises a selectable DC reference voltage source for providing a DC voltage level to one input of said comparator circuit.

5. The system as defined in claim 3 wherein said circuit means comprises a staircase generator providing a stepwise ramp voltage with a slope corresponding to a kiln temperature rise time of approximately 270° F. per hour.

* * * * *